Feb. 25, 1964            F. H. FREULER            3,122,469

MODIFIED WEB MATERIAL AND THE MANUFACTURE THEREOF

Original Filed Jan. 20, 1958            11 Sheets-Sheet 1

INVENTOR
FRED H. FREULER
BY *Berry + Brews*
ATTORNEYS.

Feb. 25, 1964 F. H. FREULER 3,122,469
MODIFIED WEB MATERIAL AND THE MANUFACTURE THEREOF
Original Filed Jan. 20, 1958 11 Sheets-Sheet 3

INVENTOR
FRED H. FREULER
BY
Berry + Crews
ATTORNEYS.

Feb. 25, 1964    F. H. FREULER    3,122,469
MODIFIED WEB MATERIAL AND THE MANUFACTURE THEREOF
Original Filed Jan. 20, 1958    11 Sheets-Sheet 4

INVENTOR
FRED H. FREULER
BY
Berry+Crews
ATTORNEYS.

Feb. 25, 1964 — F. H. FREULER — 3,122,469
MODIFIED WEB MATERIAL AND THE MANUFACTURE THEREOF
Original Filed Jan. 20, 1958 — 11 Sheets-Sheet 5

INVENTOR
FRED H. FREULER
BY
ATTORNEYS.

INVENTOR
FRED H. FREULER
BY
Berry + Crews
ATTORNEYS.

INVENTOR
FRED H. FREULER
BY
ATTORNEYS.

Feb. 25, 1964 F. H. FREULER 3,122,469
MODIFIED WEB MATERIAL AND THE MANUFACTURE THEREOF
Original Filed Jan. 20, 1958 11 Sheets-Sheet 8

INVENTOR
FRED H. FREULER
BY
Berry + Crews
ATTORNEYS.

Feb. 25, 1964   F. H. FREULER   3,122,469
MODIFIED WEB MATERIAL AND THE MANUFACTURE THEREOF
Original Filed Jan. 20, 1958   11 Sheets-Sheet 9

INVENTOR
FRED H. FREULER
BY
ATTORNEYS.

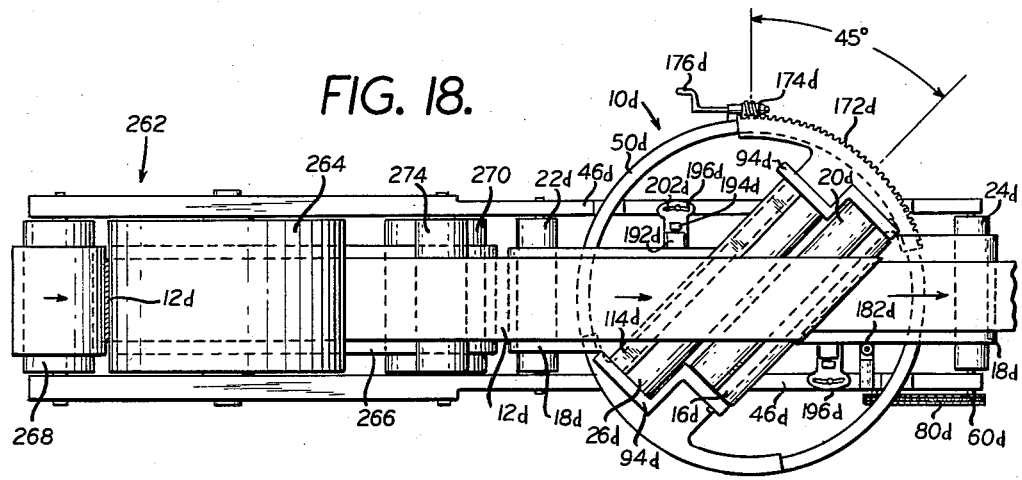
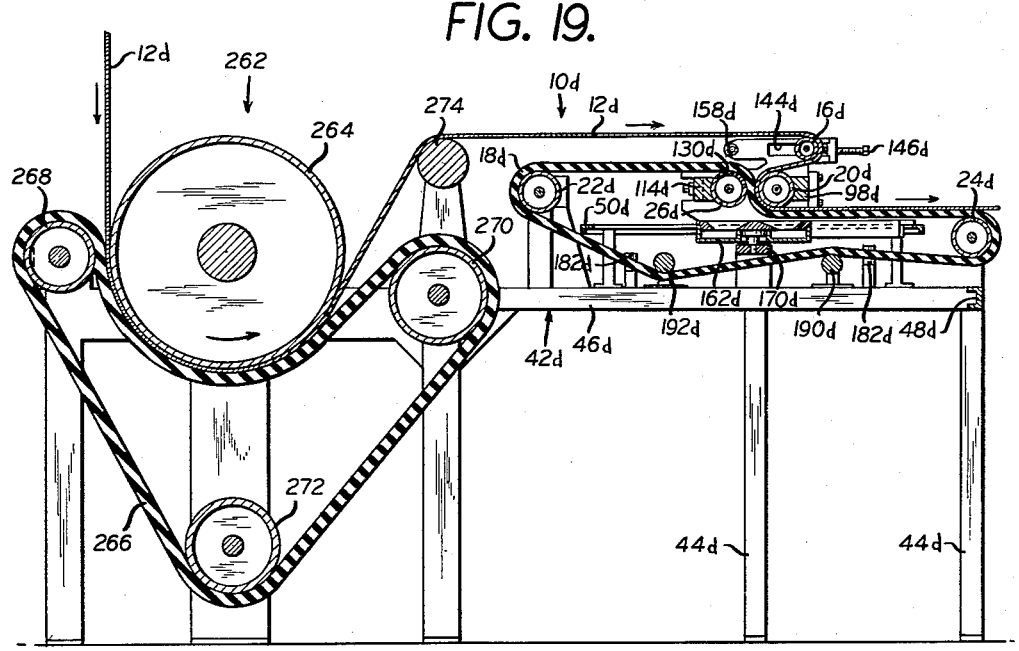

INVENTOR
FRED H. FREULER
BY
Berry + Crews
ATTORNEYS.

3,122,469
MODIFIED WEB MATERIAL AND THE
MANUFACTURE THEREOF
Fred H. Freuler, Rosedale, Covington, Va., assignor, by mesne assignments, to Clupak, Inc., New York, N.Y., a corporation of Delaware
Continuation of application Ser. No. 709,732, Jan. 20, 1958. This application June 9, 1961, Ser. No. 120,120
12 Claims. (Cl. 162—206)

This invention relates to a modified form of web material and to a method of and means for modifying the web material and is a continuation of my application S.N. 709,732, filed January 20, 1958, and now abandoned. More particularly, the invention is concerned with the production of paper web having controlled stretchability both as to amount and direction of the stretch. The invention is not confined to stretchable paper, but since it has developed out of experimental work in that field, it is shown and described herein with emphasis on the shrinking of paper to substantially increase its extensibility and toughness in any desired direction or in any two crossing directions, and more particularly to uncreped stretchable paper.

The term "uncreped" or any equivalent expression as applied to paper or other web material in the specification and claims is intended to define web material having relatively smooth and level surfaces as compared with paper that has been subjected to presently known processes of creping, crinkling, pleating or corrugating.

There have been many expedients proposed for making stretchable paper, but with one notable exception all of these proposals which have proved practical and operative have involved creping. Paper which is made stretchable by creping has little, if any, increased toughness, has little inherent capacity to resist stretching, and, being uneven, is generally unsuitable for printing and presents important obstacles to coating.

The one exception referred to above is found in the process and product disclosed and claimed in United States Letters Patent to Sanford L. Cluett, 2,624,245, of January 6, 1953. According to the Cluett patent a water laid paper web of suitable moisture content is fed to a nip formed between a traveling rubber blanket and a rotating, highly polished, heated metallic drum whose axis extends at right angles to the direction of blanket travel on the surface of the drum. The shrinkage of the blanket surface in the nip compels the paper web to be condensed and shrunk in the machine direction, that is to say, longitudinally or in the direction of web travel. The blanket and the heated drum maintain the web continuously under a very substantial pressure in the area in which the shrinkage occurs, the consequence being that an uncreped web is produced which is condensed and shrunk in the machine direction to make it stretchable to a substantial and satisfactory degree in the machine direction without any creping at all.

The stretchable paper of Cluett 2,624,245 is a useful product for many purposes. Both its surfaces are smooth and can be printed upon. These surfaces can be coated without any tendency to take out the stretch which has been put into the paper by condensation of the paper. Such paper, however, has little, if any, cross machine direction stretch (that is, stretch transverse of the direction of web travel) put into it by the machine direction shrinking, and thus it is not as satisfactory as a two-way stretchable paper would be for making paper products where cross machine direction stretch as well as machine direction stretch would be advantageous.

The majority of load conditions to which stretchable paper may be subject, such as in grocery bags or multi-wall sacks, for example, cause forces to act in all directions on the paper. Consequently the paper usually fails first in the direction of least stretch in the paper. This, in effect, means that the increased one-way stretch which Cluett provides cannot be fully utilized. For maximum effectiveness the machine direction and cross machine direction toughness should both be increased, and ideally, they should either be made equal, or proportional to the known unequal forces to which they are expected to be subjected in service.

The toughness of paper in a given direction is a combined function of its tensile strength and stretchability. If the tensile stress and elongation be plotted as ordinates and abscissas, respectively, the work done, or the energy required, to rupture the paper, which is the measure of toughness, is equal quantitatively to the area beneath the curve, that area being equal to the product of distance (elongation) by average force. Thus, the work or energy required to rupture the paper may be increased with increase of stretchability, even though there may be some impairment of tensile strength. Increased toughness, brought about by increase of stretchability, has two very important practical advantages: (1) the resistance to rupture by impact or shock is greatly increased, and (2) the resistance to rupture by localized strain is greatly increased. In both cases the load is distributed to originally unaffected elements through the yielding without rupture of the initially affected elements.

The Cluett procedure is not available for mechanically shrinking and condensing a continuous web in the cross machine direction and, therefore, leaves the problem of shrinking a continuous web in the cross machine direction without creping unsolved. It is necessarily true also that there has been no known commercial machinery or procedure for producing a continuous web of uncreped paper having stretchability in all lateral directions substantially in excess of the paper's primitive or natural stretchability.

It is a primary object of the present invention to provide uncreped paper which is shrunk in the cross machine direction to give it extra cross machine stretchability and toughness without greatly impairing its tensile strength in that direction.

It is similarly a primary object to provide uncreped paper which is shrunk in both machine and cross machine directions to give it extra stretchability in all directions, without greatly impairing its tensile strength in any direction.

It is a further primary object to provide novel methods and means for producing papers of the kinds referred to.

For securing cross machine shrinkage, it is a feature of the invention that provision is made of a deformable traveling blanket, desirably of rubber, together with a pair of rigid blanket displacing rods which are disposed in parallel relation to one another but in oblique relation to the direction of blanket and web travel, the arrangement being such that a moist paper web, fed in the direction of blanket travel, is caused, without creping, to be shrunk directly crosswise or diagonally as desired. The first rod is a pressure rod while the second rod is a nip-forming, smoothing rod. The rods may be fixed against rotation, although rotary rods rotating in the same direction may also be employed with advantage.

It has been found that the direction of web shrinking can be preselected by properly adjusting the angular relation of the rods to the direction of travel of the blanket and the web. It has also been found that the measure of shrinkage can be predetermined by adjustment of the spacing of the rods relative to the thickness of the blanket, to provide blanket deforming pressure at a nip formed by and between the blanket and the second rod.

By setting the rods at right angles to the direction of web and blanket travel, the shrinkage is caused to occur in the machine direction of the web. By setting the rods at a appropriate angle in the neighborhood of 45° to the direction of web and blanket travel, the shrinkage is, surprisingly, caused to occur substantially directly across the web. By setting the rods at an appropriate angle in the neighborhood of 57° to the direction of web and blanket travel, the shrinkage is caused to occur chiefly at an angle of 45° to the direction of web and blanket travel.

Two-way stretch can be provided, therefore, by combining a first unit of the new mechanism, with the rods set at an appropriate angle for shrinking the web squarely across its width, with a Cluett unit, or by combining such first unit with another unit of the new mechanism in which the rods extend squarely across the web and blanket paths. In either case units may be arranged to shrink the web first in the machine direction and then in a cross machine direction, or vice versa.

Alternatively, two-way stretch can be provided by combining two units of the new mechanism with the rods of the first unit disposed at an appropriate angle to shrink the web at a desired inclination to the direction of web and blanket travel, and with the rods of the second unit disposed to shrink the web at an equal but opposite inclination to the direction of web and blanket travel.

The present shrinking mechanism is simple and dependable in operation and is relatively inexpensive. It may therefore be used to advantage in shrinking paper even when the avoidance of creping is not of interest, or when creping is definitely desired.

The novel shrinking unit is also useful for pre-shrinking woven fabrics to render them non-shrinkable when washed. It is also useful for shrinking non-woven fabrics, the fibers of which are susceptible of being suitably moistened or otherwise made into a plastic state.

Other objects and advantages will hereinafter appear.

In the drawing forming part of this specification,

Figure 13:
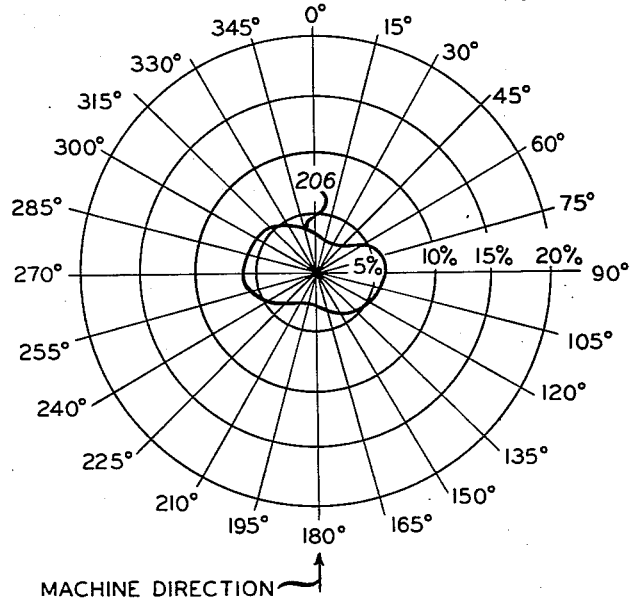
FIG. 13 is a chart showing the stretch characteristics of a web of paper having only its native stretchability.
Figure 20:
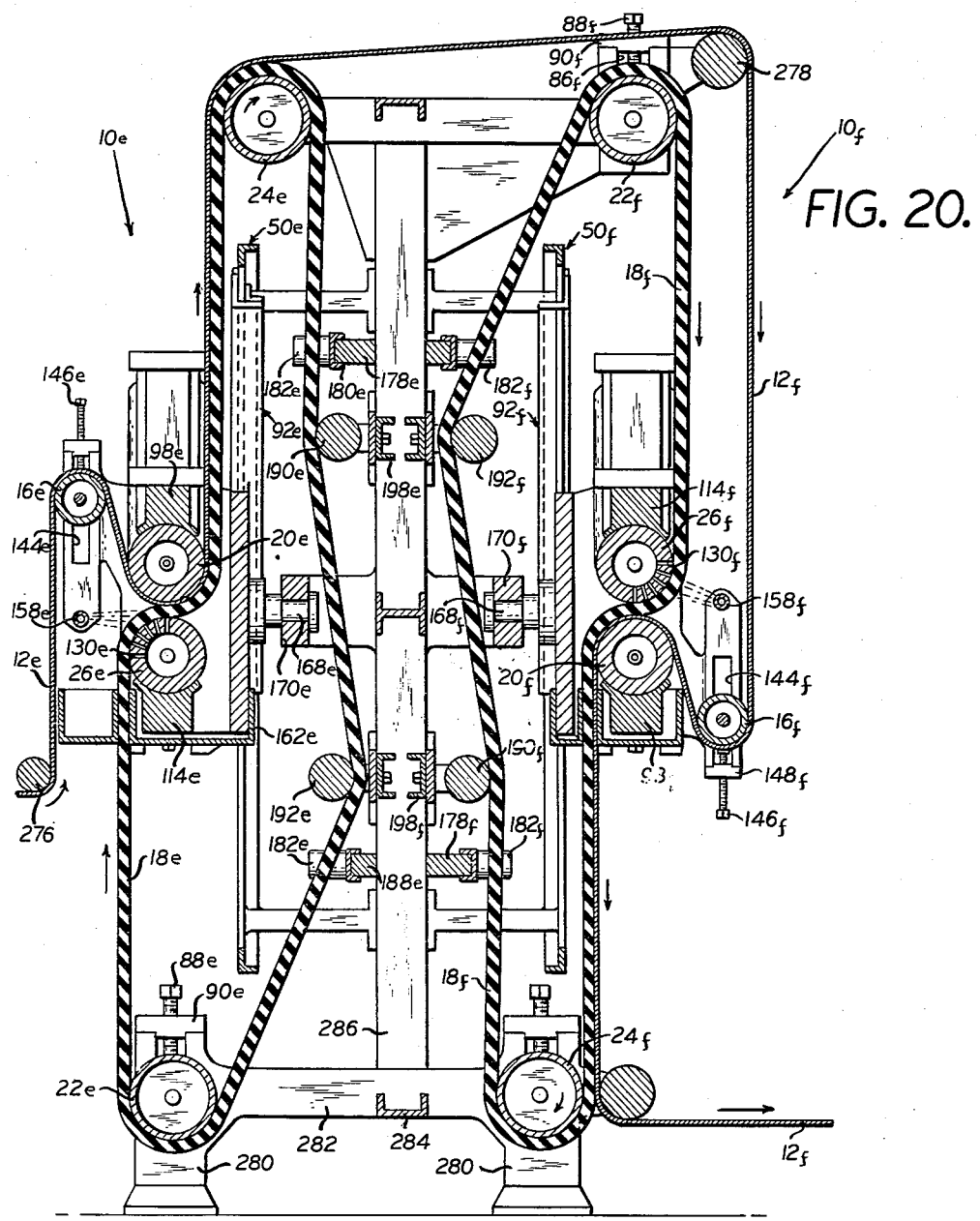
Figure 21:
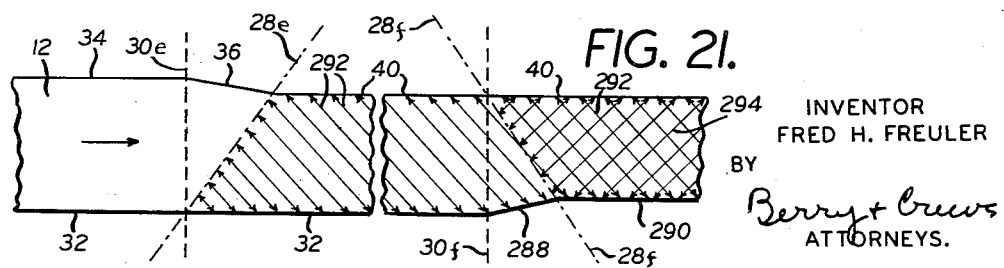

FIGS. 14 to 17, inclusive, are charts similar to FIG. 13, but of larger scope, which show the respective stretch characteristics of webs which have been (a) shrunk longitudinally, (b) shrunk directly crosswise of the web, (c) shrunk at substantially 45° to the lengthwise dimension of the web and (d) shrunk at plus and minus 45° to the lengthwise dimension of the web;

FIG. 18 is a plane view of a composite mechanism in which the moist paper web is first fed to a Cluett unit to shrink it in the machine direction and then through the novel unit of FIGS. 1 to 6 to shrink it in the cross direction;

FIG. 19 is a view in longitudinal vertical section of the mechanism illustrated in FIG. 18;

FIG. 20 is a view in longitudinal vertical section of a composite shrinking mechanism comprising two of the units of FIGS. 1 to 6 arranged in tandem, back to back and disposed vertically rather than horizontally; and FIG. 21 is a diagrammatic view illustrating the effect of the composite mechanism of FIG. 20 upon a paper web.

The machine or unit 10 of FIGS. 1 to 6 can be set to shrink a paper web lengthwise, directly crosswise or at an intermediate oblique angle. As shown, the unit 10 is set to shrink a paper web obliquely across the web (cross machine direction), and it will be described first in connection with that use.

The unit 10 is designed for use directly in a paper making machine, or in a separate paper modifying machine. In either case a suitably moist paper web 12, desirably having a moisture content of 25 to 45%, wet basis, is paid out to the unit by suitable means, for example a feed couple 14, at a controlled speed which assures freedom from substantial tension and freedom from objectionable slack. The feed couple 14 may be regarded as a fragment of a preceding paper making structure, or as a fragment of an automatically controlled unreeling and feeding mechanism.

The unit 10 will be first briefly explained and described by reference only to its principal parts and to its effect upon the paper web, and more detailed description will then be given.

The paper web 12 is directed around a guide rod or roller 16 and thence to a shrinking nip formed by and between an endless driven deformable rubber blanket 18 and a non-rotary, fixed, nip forming and smoothing rod 20. The blanket 18 is mounted at its ends upon supporting rollers 22 and 24, being driven by the latter. A stationary, non-rotary, pressure rod 26 is opposed to the rod 20 in such close proximity to the rod 20 that the blanket is necessarily deformed by squeezing as it passes between the rods. As shown, the rods extend at an angle of about 57° to the direction of travel of the paper web 12 and the blanket 18. The blanket 18 is squeezed in passing between the rods 20 and 26, the arrangement in the illustrative case, as shown more particularly in FIG. 6, being such that the normal thickness of the belt is one inch and the spacing between the rods is seven-eighths of an inch.

With an arrangement of this kind the rubber, which is deformable but incompressible, is accelerated at the nip, just as an incompressible liquid is accelerated as it passes through a constricted portion of a conduit. The paper enters the nip at the accelerated speed of the rubber, but as the rubber passes the point of greatest constriction and reassumes its normal shape, the rubber slows down and causes the paper to be slowed down and condensed. The pressure maintained between the blanket 18 and the rod 20 may be of sufficient magnitude to prevent creping of the paper. The constriction principle is known as the venturi effect. It enables different measures of paper shrinking or condensing to be effected according to the measure of constriction and the consequent acceleration of the rubber. The use of a non-rotary pressure rod such as the rod 26 and the venturi effect are not per se features of the present invention. They are disclosed, claimed and more fully explained in an application of Welsh and Balough, Serial Number 709,731, for Pressure Loading Means for Traveling Blankets, filed concurrently herewith.

A feature of primary importance is the cross-shrinking secured by the present invention.

The cross component of the shrinking action rests on the fact that the flow of a deformable material (the surface of the rubber blanket), in passing through an obliquely disposed constriction, in this case the nip between the pressure and smoothing rods, tends to take the shortest possible path, i.e., a path substantially perpendicular to the constriction. The result is that a sidewise component of force is developed within the pressure area of the nip at substantially right angles to the nip. The paper is therefore pushed and crowded sidewise and caused to be shrunk or compacted in various selected directions according to the angular setting of the rods, nip configuration, and other operational variables.

Figure 7:
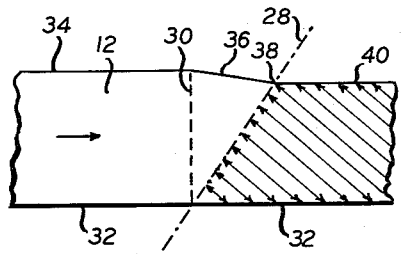
FIG. 7 is a diagrammatic view illustrating roughly how the paper web is progressively shrunk toward one edge of the web when the rods are disposed obliquely to the direction of web travel.

The fixing of the rods 20 and 26 at an angle in the neighborhood of 57° to the direction of web and blanket travel has been found to cause the web to be shrunk at 45° to its lengthwise dimension. The effect of the obliquely disposed nip upon the web is diagrammatically illustrated in FIG. 7. In FIG. 7 the web 12 is shown roughly as it would appear in a flat, extended condition, the wrap around the rods 16 and 20 being ignored and the line of initial nip engagement being represented by the broken line 28. When the leading end of the web 12 coincides with the dotted cross line 30, the leading end of the web edge 32 is just entering the nip. As the web advances it is progressively shrunk toward the web edge 32 and this draws the opposite web edge toward the edge 32 until the leading end of the opposite web edge enters the nip. The opposite web edge therefore extends along a straight course 34 parallel to the edge 32 up to the line 30, then along a course 36 which is inclined toward the edge 32 until the point 38 is reached at which this edge enters the nip, and finally along a straight course 40 which is parallel to the edge 32. In normal operation this pattern of progressive shrinkage is maintained so long as the feeding of the web through the unit is continued.

For increasing the amount of shrinkage, the rod 26 is adjusted toward the rod 20 to increase the pressure exerted upon the blanket 12 at the nip. For varying the angle of shrinkage, the rods 20 and 26 are angularly adjusted in unison about a vertical axis to change their relation to the direction of travel of the blanket 18. These operations and the underlying principles will be discussed further after the structure of the unit 10 has been described in detail.

The unit 10 comprises a suitable rigid frame 42 which includes upright members 44, longitudinal members 46, cross members 48, a rigid circular platform 50, and platform supporting legs 52.

A shaft 53 mounted in suitable frame bearings 56 supports and drives the roller 24. The shaft 53 also has fast upon it a sprocket 60 through which the shaft and the roller 24 are driven from a drive motor 62. The output shaft 64 of the motor 62 has fast upon it a sprocket 66 which, through a chain 68, drives a sprocket 70 fast on the input shaft 72 of an infinitely variable speed gear unit 74. A clutch 73 is included between sections of the shaft 72. An output shaft 76 of the unit 74 has fast upon it a sprocket 78 which, through a chain 80 and the sprocket 60, drives the shaft 58.

A shaft 82, supported in bearings 84, has fast upon it the roller 22. Each bearing 84 is guided for sliding movement in a frame slot 86 so that it may be adjusted toward and from the roller 24. In each instance a headed adjusting screw 88, threaded through a frame member 90, has a circumferentially grooved end connected so that it may be turned relative to the associated bearing 84 but will compel the bearing to move in unison with the screw in the direction of the screw axis.

Figure 2:
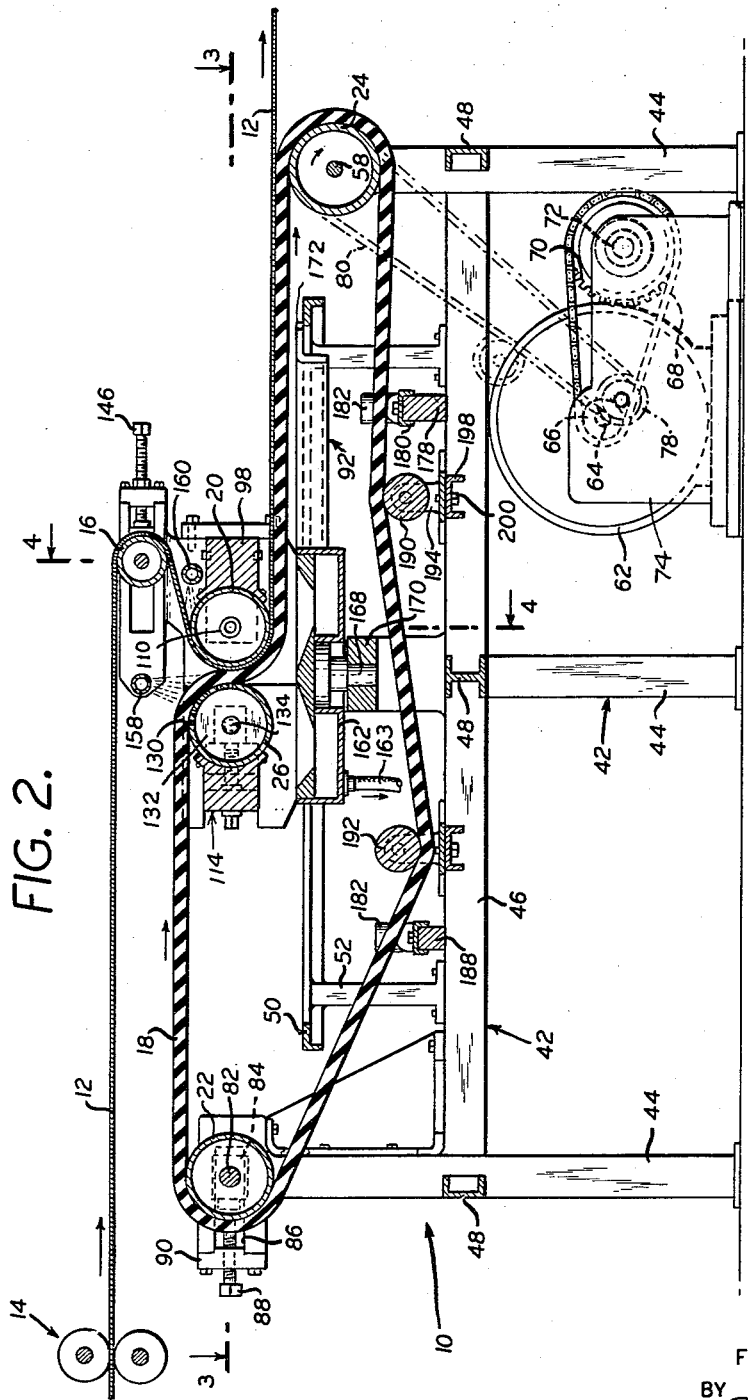
FIG. 2 is a vertical sectional view taken on the line 2—2 of FIG. 1, looking in the direction of the arrows.
Figure 3:
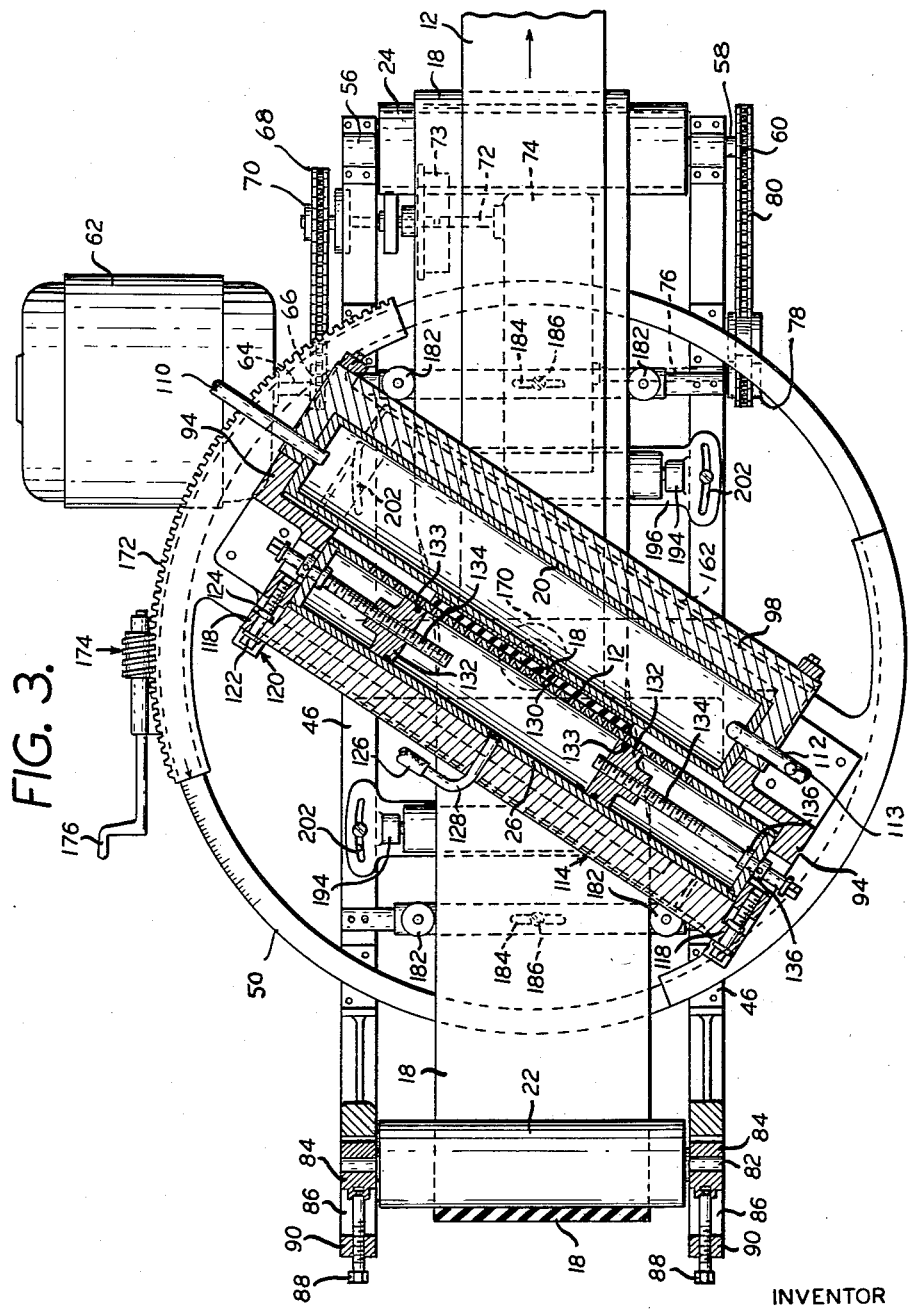
FIG. 3 is a horizontal sectional view taken on the line 3—3 of FIG. 2, looking in the direction of the arrows.
Figure 6:
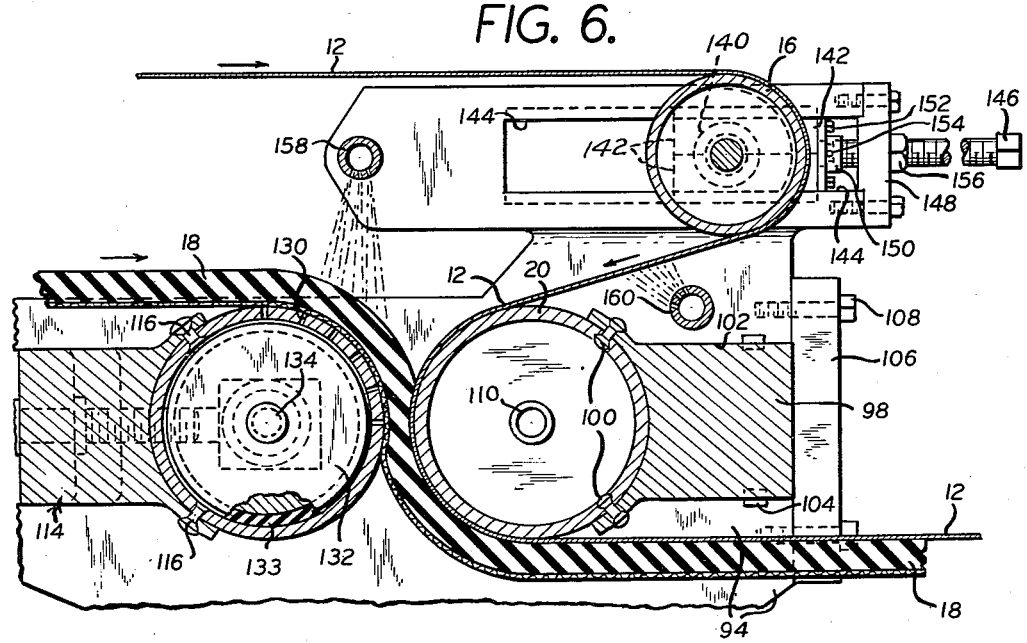
FIG. 6 is a fragmentary sectional view taken on the line 6—6 of FIG. 1 looking in the direction of the arrows, the view being on a larger scale than FIGS. 4 and 5.

The platform 50 supports a turntable 92 which includes rigid, upstanding bearing columns 94. The rod 20, which is hollow, includes supporting bosses 96 which are mounted in the columns 94. A rigid supporting and stiffening bar 98 is made unitary with the rod 20, as by rivets 100 (FIGS. 2 and 6). The bar 98 is longer than the rod 20 and is supported at its ends in slots 102 of the columns 94. The bar 98 is connected through keys 104 with the columns 94, and is also backed up by bars 106 which are secured to the columns 94 by machine screws 108.

The rod 20 is steam heated, the steam under substantial super-atmospheric pressure being fed in through a steam supply pipe 110 which extends axially through one of the bosses 96. A condensate return pipe 112 extends axially through the other boss 96, the pipe 112 being provided with a downturned end within the rod 20 so that condensate will be forced out of the rod by steam pressure and will not accumulate in the rod to any substantial depth. The return pipe 112 is equipped with a conventional thermostatic relief valve 113 for enabling air to escape when steam is first admitted after a shutdown period. The heating of the rod causes the web to be heated, and thereby promotes the setting of the fibers in the condition to which they are deformed at the web shrinking operation.

The rod 26 is also supported by the bearing column 94, but with provision for adjustment toward and from the rod 20. Independent adjusting means are provided at opposite ends of the rod 26. The rod 26 is made unitary with a rigid backing bar 114 in any suitable way, as by rivets 116. The bar 114 includes ears 118 at its ends through which adjusting screws 120 extend. Each screw is provided with a head 122 and a collar 124. The head and collar engage opposite sides of the associated ear 118 to confine the screw against axial movement relative to the bar 114 while leaving the screw free to be turned relative to the bar. The threaded end of the screw is screwed into the associated column 94. The adjusting screws may be operated to secure a desired spacing of the rod 26 from the rod 20 and also to secure even spacing throughout.

The rod 26 includes provision for furnishing water or other suitable lubricant between the rod itself and the blanket 18. For this purpose a flexible water supply hose 126 is connected to a pipe 128 which extends through the backing bar 114 and communicates with the interior of the hollow rod 26. The rod 26 is provided with rows of perforations 130 which extend over the arc of contact of the blanket 18 with the rod, so that a film of lubricating water under pressure will be maintained at all times between the blanket and the rod.

Since the rods 20 and 26 are adapted for angular adjustment with the turntable 92, a greater distribution of the perforations 130 longitudinally of the rod is required for some settings than for others, it being necessary that the entire width of the blanket 18 be lubricated but that no water be squirted through perforations which lie outside the lateral bounds of the blanket. The rows of perforations are extended, therefore, as far out as is necessary for meeting the most extended requirements, and adjustable pistons or valve members 132 are provided for selectively disabling the perforations to deliver water.

Each piston 132 is provided with an O-ring 133 which serves the dual function of providing a seal and of frictionally restraining the piston against rotation. A threaded adjusting screw 134 is provided for each piston 132. Each screw 134 has an unthreaded portion which is passed through an end wall of the hollow rod 26 and includes collars 136 which bear against opposite faces of the end wall for restraining the screw against axial movement while leaving it free for rotation. Rotation of the screws serves to extend or shorten the water containing chamber within the rod 26 which is bounded by the pistons 132, and thereby serves to limit delivery of water to the zone of the roller which is traversed by the blanket 18.

Figure 4:
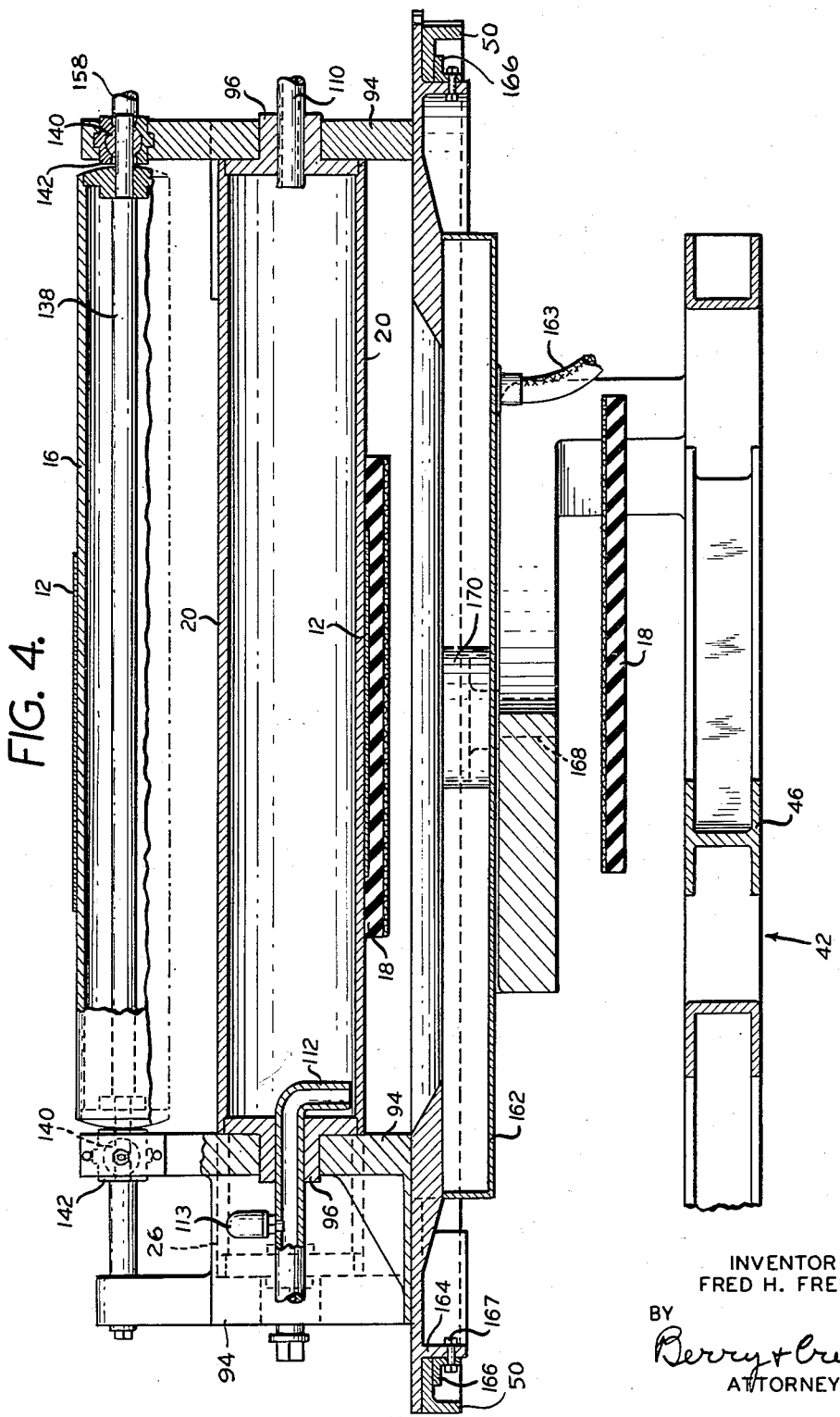
FIG. 4 is a fragmentary sectional view in elevation taken on the line 4—4 of FIG. 2, looking in the direction of the arrows, the view being on a larger scale than FIGS. 1 to 3.
Figure 5:
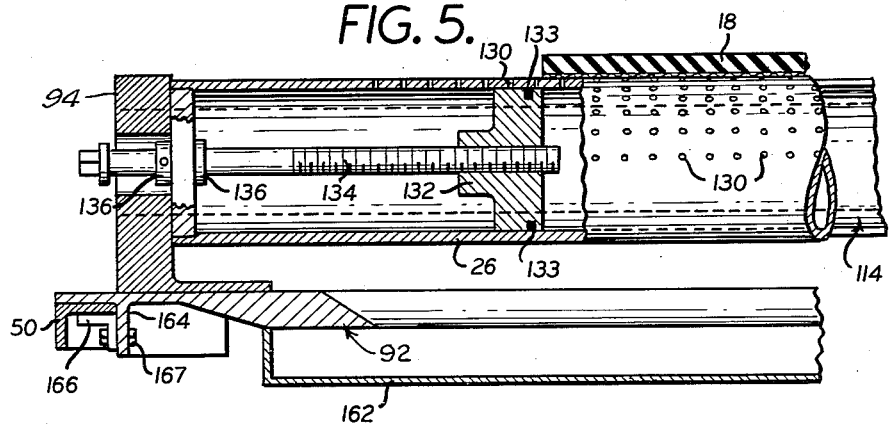
FIG. 5 is a fragmentary sectional view taken on the line 5—5 of FIG. 1 looking in the direction of the arrows, the view being on the same scale as FIG. 4.

The guide roll 16 is also carried by the columns 94 of the turntable 92. The roll 16 is therefore adjusted angularly in unison with the rods 20 and 26. With the web 12 fed to the shrinking unit in a direction parallel to the travel of the active stretch of the blanket 18 and fed away in the same direction, the ideal arrangement would be to maintain parallelism of the roll 16 with the rods 20 and 26 at all times, were it not for the fact that the varying amounts and directions of shrinkage which the web can be selectively caused to undergo at the nip call for slightly varying the angular relation of the roll 16 to the rods 20 and 26. Details of the mounting of the roll 16 are best shown in FIGS. 4 and 6.

The roll 16 is made fast upon a shaft 138 whose ends are rotatably and slidably supported in bearing balls 140. The mountings are duplicates of one another. Each ball 140 is rotatably supported in a split bearing 142. Each bearing 142 is supported and guided for movement along a slot 144 of the associated bearing column 94. A headed adjusting screw 146 is threaded through a fixed supporting block, the block being secured to the standard 94 by machine screws 148 and extending across the open end of the slot 144. The screw 146 has an unthreaded, grooved inner end which extends through a circumferentially flanged cap member 150. The cap member 150 is connected through its circumferential flange by screws 152 with the two sections of the split bearing 142 and serves as a connector between them. A pin 154 driven radially into the cap 150 rides in the groove of the screw 146 and compels the bearing block to participate in the axial movement of the screw. A desired adjustment can be effected by operation of either one or both of the screws 146. Lock nuts 156 are provided for fixing the screws 146 in their adjusted positions.

A spray pipe 158 extends above the blanket 18 from one of the columns 94 to the other for delivering a small quantity of water onto the upper face of the blanket. This is done for the purpose of lubricating the margins of the upper face of the blanket 18 which extend beyond the lateral bounds of the paper web 12 and the entire width of the blanket 18 when there is no paper fed. The supply pipe 160 is also provided for spraying lubricant, desirably a dilute water solution of silicone, onto the the face of the paper which is destined to travel around the rod 20 in contact with the rod. The turntable 92 is provided centrally with a pan 162 for catching the water which drips down from the rod 26 and the blanket 18 (the water having been principally delivered through the rod 26), and delivering the water to a discharge hose 163.

The turntable rests on the platform ring 50 and includes downturned flanges 164 which extend just inside the platform ring. Angle brackets 166 detachably secured to the flange 164 by bolt and nut combination 167 extend under the ring 50 and prevent lifting of the turntable 92 away from the ring 50 at any point. The turntable is provided with a central bearing 168 which rests upon, and is rotatable in, a bearing bar 170 of the frame. At one side the turntable 92 is provided with a rack segment 172 which is in mesh with a frame carried worm 174. The worm includes a crank handle 176 through which the worm may be operated for adjusting the turntable and the mechanism carried by the turntable to any desired setting, limited on the one hand by a setting which will shrink the paper web longitudinally and on the other by a setting which will shrink the paper web at right angles to its length.

Figure 1:
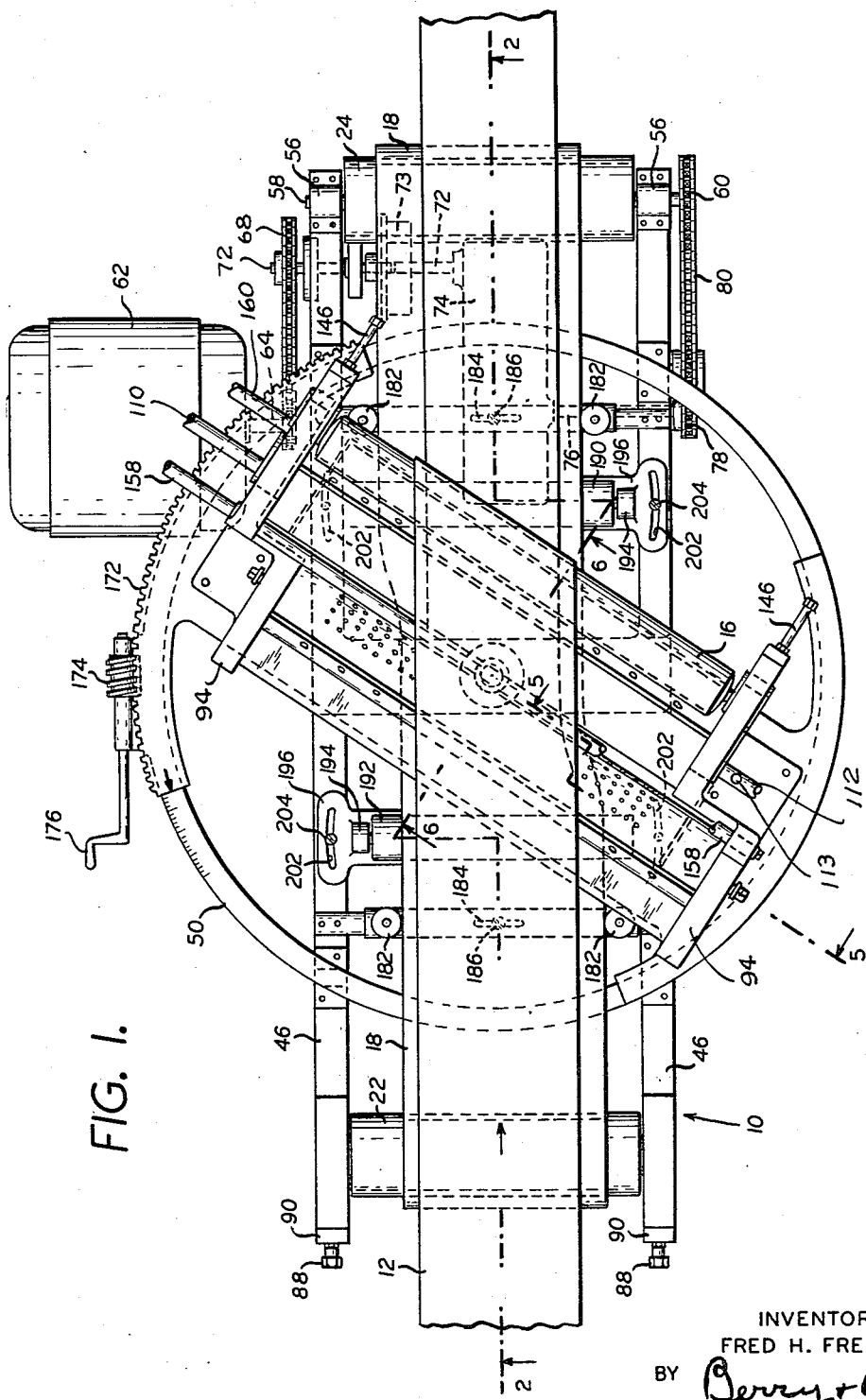
FIG. 1 is a plan view of an illustrative paper modifying machine or machine unit which forms a practical and advantageous embodiment of features of the invention.

As the parts are shown in FIGS. 1 to 6 the blanket 18 has a substantial wrap around the rod 26 in one direction and then around the rod 20 in the opposite direction. The rods, moreover, are set to extend at an angle of in the neighborhood of 57° to the direction of blanket travel. As a consequence the blanket is offset laterally, as illustrated in FIG. 1, by its passage around the obliquely disposed rods. The offsetting of the blanket interferes with tracking, causes the blanket to be offset axially along the roller 24 as compared with its position on the roller 22, requires the blanket to return obliquely from the roller 24 to the roller 22, and tends to cause uneven longitudinal tension of the blanket along its opposite edges and intermediate its edges. Provision is made, as seen best in FIGS. 2 and 3 of means for controlling the travel of the blanket in its return stretch.

A stationary crossbar 178, located near the roller 24, slidingly supports and guides a flanged plate 180 upon which upstanding guide rollers are rotatably supported for engaging opposite edges of the blanket simultaneously. The plate 180 is formed with a longitudinal slot 184. A headed clamping bolt 186 is passed downward through the slot and threaded into the bar 178 for fixing the rolls 182 in desired positions of adjustment. A further stationary bar 188 located near the roller 22 carries a second set of edge guiding rollers 182 which are of the same construction as the pair already described and are similarly mounted and adjusted.

Between the two sets of edge guiding rollers 182 two guiding rollers 190 and 192 are provided, the first for engaging the face of the blanket 18 and the second for engaging the back of the blanket. The rollers 190 and 192 are of like construction and are similarly mounted. A description of the mounting of the roller 190 will, therefore, suffice for both.

The shaft of roller 190 is mounted in bearing standards 194 which extend upward from a bearing plate 196. The plate 196 rests upon the longitudinal frame members 46 and upon a channeled cross frame member 198. The plate 196 is pivotally mounted at its midpoint on the member 198 by means of a pivot screw 200. At each end the plate 196 is formed with an arcuate slot 202. Each slot 202 overlies one of the frame members 46. A headed clamping bolt 204 is passed through each slot 202 and threaded into the associated member 46 for fixing the plate in adjusted position. The roller 190 is disposed to flex the blanket 18 upward while the roller 192 is disposed to flex the blanket downward. Angular adjustment of a roller, therefore, serves both relatively to adjust the tension in the opposite edges of the blanket and to alter the course which the blanket will follow in leaving the roller.

The blanket 18 is desirably provided with an inextensible cord fabric backing, although this is not essential. The body of the blanket is desirably composed of resilient rubber having a Shore durometer hardness of 35 to 60.

The stretch properties of paper which has been subjected to the action of the unit 10 under various settings are illustrated in the charts designated FIGS. 14 to 17. The stretch properties of a web of the same paper finished in a normal way and without shrinking are illustrated in the chart designated FIG. 13. Kraft paper of the same composition and continuously formed into a web under the same conditions was used in producing the samples tested for securing the information upon which all the charts are based.

For constructing FIG. 13 strips one-half inch wide were cut from a control web in the machine direction, at an angle of 15° to the machine direction, and at angles corresponding to all possible integral multiples of 15° to the machine direction. The stretchability of each strip in the direction of its length was determined and the result of the determination was entered by marking the appropriate point on the chart. From the points thus marked the curve 206 was drawn. It will be observed that the native stretchability of the paper in the machine direction was about 2½% and that the native stretchability in the cross direction was about 6%. This is a typical relationship, for while paper generally has more tensile stregnth in the machine direction because of the paper grain, it generally has more native stretchability in the cross direction because it is subjected to less tension in that direction during manufacture.

Figure 14:
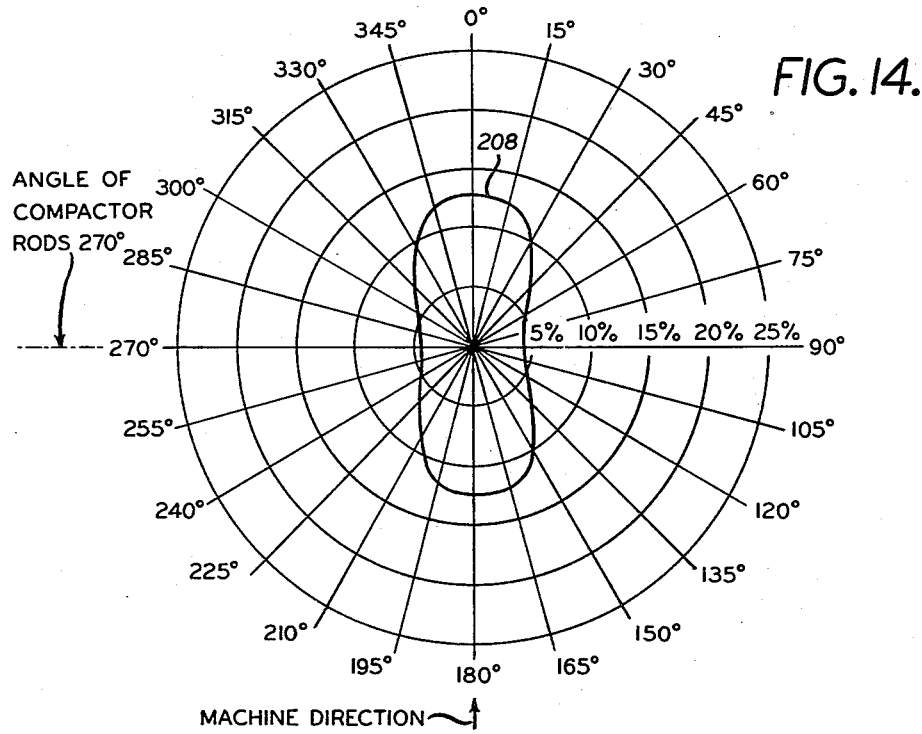

The curve 208 of FIG. 14 illustrates a typical case of paper put through the unit 10 with the rods 20 and 26 disposed at right angles to the machine direction. It will be observed that the machine direction stretch has been increased to about 12% but that the cross direction stretch has not been altered appreciably.

Figure 15:
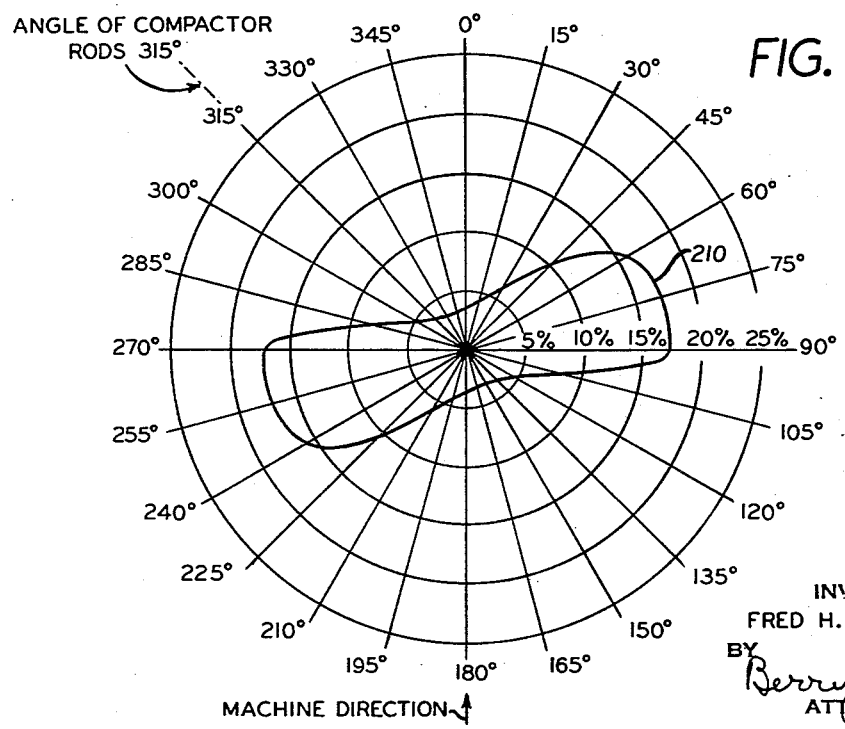

The curve 210 of FIG. 15 illustrates a typical case of paper put through the unit 10 with the rods 20 and 26 disposed along the 135–315° line, or in other words with the rods disposed at 45° to the machine direction. The machine direction stretch of the paper has not been altered appreciably. The maximum stretch is found to occur directly across the web and to be about 17½%.

Figure 16:
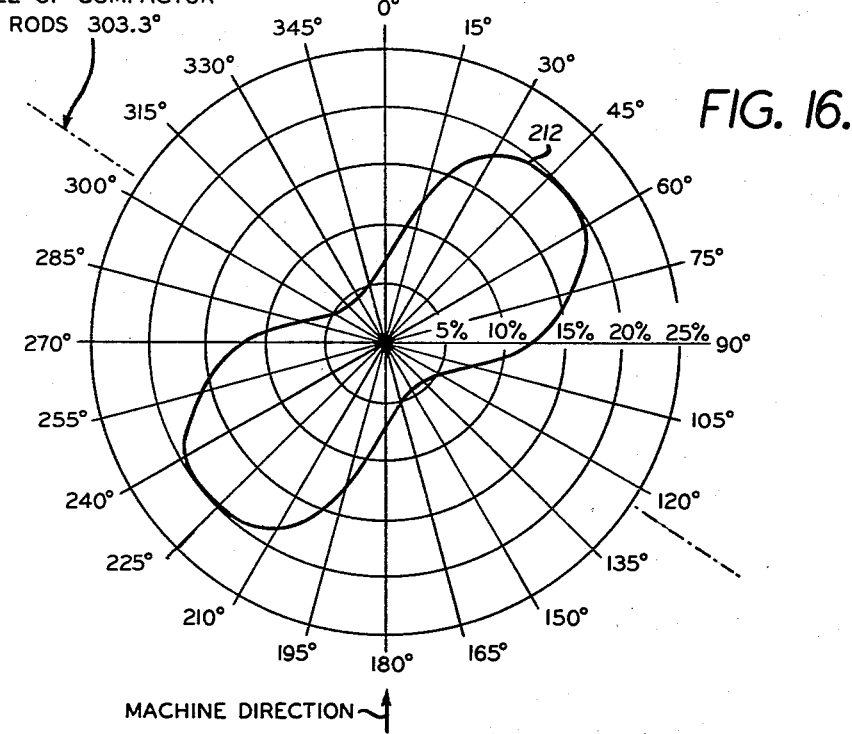

The curve 212 of FIG. 16 illustrates a typical case of paper put through the unit 10 with the rods 20 and 26 disposed along the 123.3–303.3° line, or in other words with the rods disposed at 56.7° to the machine direction. The machine direction stretch and the cross direction stretch have both been increased as compared with FIG. 13, but the greatest stretch is found to be along the 45–225° line and amounts to approximately 20%.

Figure 17:
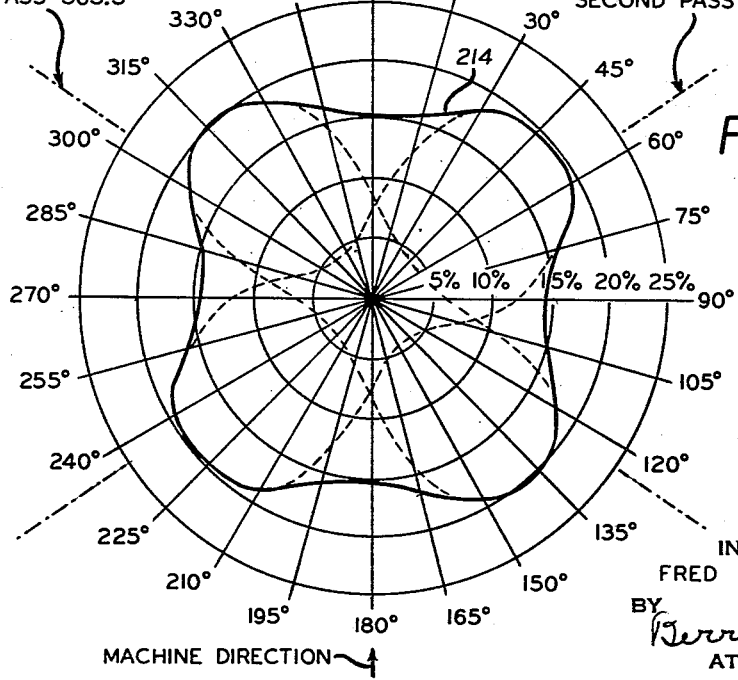

The curve 214 of FIG. 17 illustrates a typical case of paper put through the unit 10 twice, once with the rods 20 and 26 disposed along the 123.3–303.3° line, and a second time with the rods disposed along the 56.7–236.7° line. Otherwise expressed, this means that the rods were disposed at plus 56.7° to the machine direction in the first instance and minus 56.7° to the machine direction in the second instance. The dotted lines represent the contribution of the respective passes to the composite curve 214. The same effect can be had by leaving the first setting of the rods unchanged while turning the web over and feeding it through a second time in the same direction as before. The curve 214 is seen to have a rounded but generally square shape with the greatest stretch extending along the two diagonals and amounting to substantially 20%.

Figure 8:
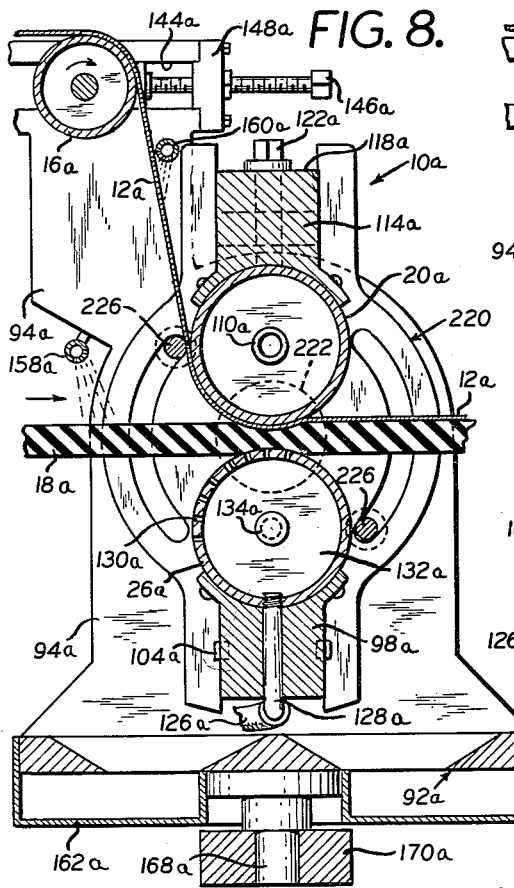
FIG. 8 is a fragmentary view in sectional elevation of a portion of a machine similar to that of FIGS. 1 to 6, but having provision for adjusting the rods about an axis parallel to the rod axes and located midway between them.
Figure 9:
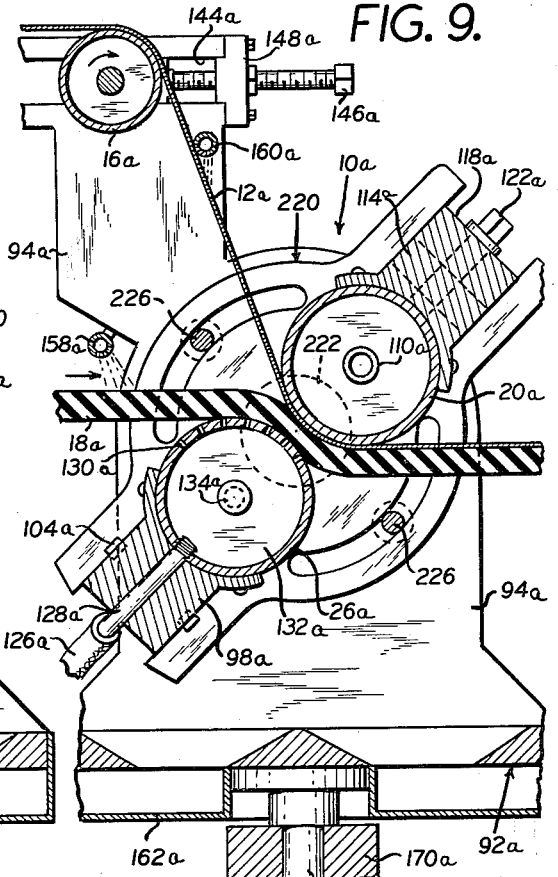
FIG. 9 is a view similar to FIG. 8 of the mechanism shown in FIG. 8, but showing the rods in a different angular setting.

In FIGS. 8 and 9 disclosure is made of a modified unit 10a which embodies all the features of the unit 10 but differs in the fact that provision is made for adjusting the pressure and nip forming rods about an axis parallel to their own axes and located midway between them. Since the unit 10a is generally the same as the unit 10, only the portion of the unit which embodies the changes is illustrated. Parts which are unchanged will not be described, but so far as they are illustrated they are designated by the same reference numerals as before with the suffix "a" added in each instance.

The turntable 92a carries columns 94a which are modified in shape, each column being disposed in a single plane and the columns jointly being adapted to support with capacity for rotary adjustment about a horizontal axis, sub-carriage members 220. Each member 220 is formed with a bearing hub 222 through which it is rotatively supported by the associated column 94a. The rods 20a and 26a are mounted upon the subcarriage members 220 in precisely the same way that the rods 20 and 26 were described as mounted directly on the columns 94. In this instance, however, the rod 26a is fixed in its relation to the members 220 and the rod 20a is supported with capacity for adjustment toward and from the rod 26a. The reversal has no significance and has been resorted to only for avoiding interference with the turntable 92a. Each subcarriage member 220 is provided with a pair of arcuate slots 224. Clamping screws 226 have their shanks passed through the slots and threaded into the columns 94a for securing the subcarriage members 220 and the rods in different positions of rotative adjustment about the axis defined by the hubs 222. The columns 94a are further modified to carry the roller 16a and its mounting and adjusting means somewhat higher and somewhat further to the left than the corresponding parts of the unit 10. The spray pipes 158a and 160a are relocated to perform the same service as before.

The unit 10a of FIGS. 8 and 9 has the advantage that the wrap of the blanket about the rods 20 and 26 can be reduced when desired. This is advantageous from the standpoint of reducing the friction load. It is also advantageous when a less smooth finish is desired than that which is produced by the arrangement shown in FIGS. 1 to 6. The reduced wrap of the blanket 18a on the rods 20a and 26a also simplifies the problem of tracking when the rods are obliquely disposed, there being less lateral displacement of the blanket when the wrap is reduced. The angular arrangement shown in FIG. 8 would not be capable of effecting shrinkage of a paper web but would be useful for producing a smoothing action. The angular disposition of FIG. 9, however, would be well adapted for shrinking paper.

In the adjusted positions of FIGS. 8 and 9 some of the perforations 130a of the rod 26a are not covered by the belt 18a. Removable plugs, not shown, may be threaded into such perforations.

Figure 10:
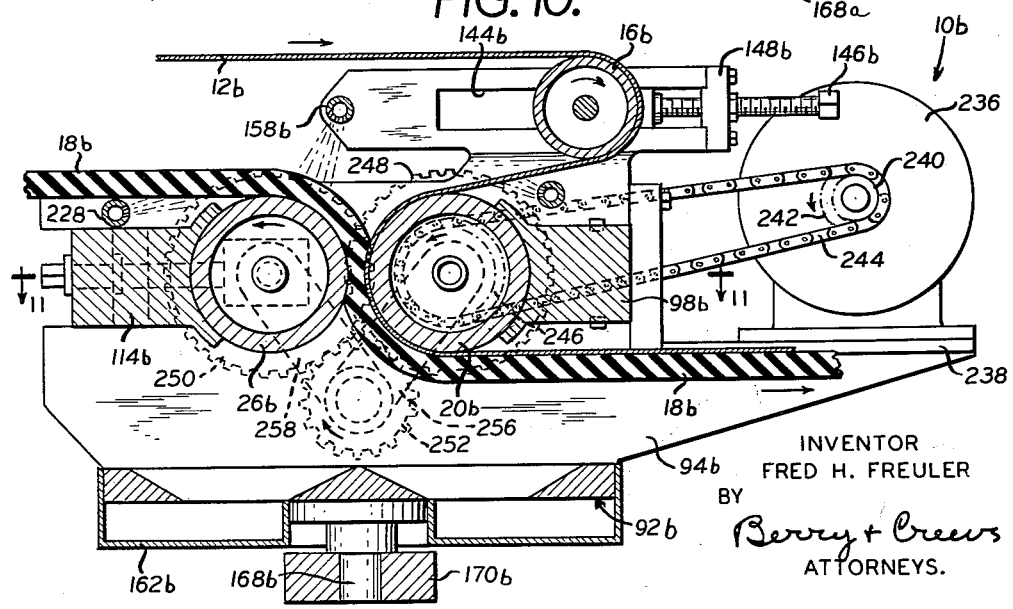
FIG. 10 is a fragmentary view in sectional elevation of a portion of a further machine, similar to that of FIGURES 1 to 6 but having provision for driving the rods rotatively.
Figure 11:
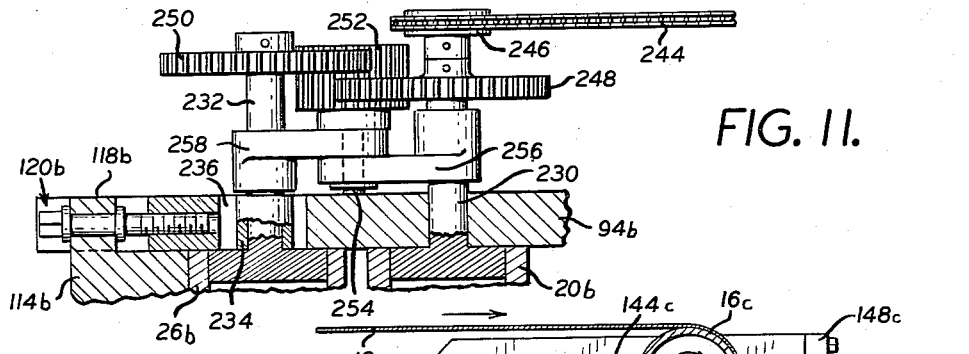
FIG. 11 is a fragmentary plan view of the structure shown in FIG. 10.

In FIGS. 10 and 11 a further modified unit 10b is disclosed in which the rods are made cylindrical and are rotatively driven. The unit 10b is the same as the unit 10 except for specific differences which are illustrated and which will be described. Only the portion of the unit embodying changes is illustrated and parts which are shown but not changed are designated by the same reference numerals as before with the suffix "b" added in each instance.

The rods 20b and 26b are supported by the columns 94b, but the bars 98b and 114b are unconnected to the associated rods, being arranged to constitute backing and reinforcing bearings instead. Lubricating water is supplied between the blanket 18b and the rod 26b by a spray pipe 228. The rod 26b is made imperforate and no provision is made from feeding water through it. The rods 20b and 26b are carried on rigid shafts 230 and 232, respectively. The shaft 230 has fixed bearing in the columns 94b but the shaft 232 is supported in external rectangular bearings 234 which are slidable in slots of the columns 94b. The rod 26b is spaced from the rod 20b by the blanket 18b but is pressed forcibly toward the rod 20b by the bearing bar 114b.

A motor 236, mounted on an extension 238 of the turntable 92b, has fast upon its output shaft 240 a sprocket 242. The sprocket 242 acts through a chain 244 to drive a sprocket 246 which is fast on the shaft 230. The shaft 230 also has fast upon it a gear 248 which drives an equal gear 250 fast on the shaft 232 through an intermediate pinion 252. The pinion 252 is unitary with a pin 254 which is carried jointly and with freedom to rotate by links 256 and 258 which are mounted with freedom to swing on the shafts 230 and 232, respectively. The link 256 is of such length that it maintains the pinion 252 properly in mesh with the gear 248 at all times, while the link 258 is of such length that it maintains the pinion 252 properly in mesh with the gear 250 at all times. Regardless of the relative spacing of the shafts 230 and 232 the shafts are compelled by the described gearing to rotate in unison. As indicated by the arrows, rod 20b is being driven in harmony with the direction of movement of the blanket 18b but the rod 26b is being driven counter to the direction of movement of the blanket 18b. This arrangement can be reversed, however, by reversing the motor 236.

The rod 20b and 26b are always driven at slow speed, say at a peripheral velocity of the order of one hundred feet per minute as compared with a rate of paper feed of the order of fifteen hundred feet per minute. The purpose of rotating the rods is primarily to assist tracking, to promote even wear of the rods and to prevent the accumulation of line on the rod 20. When the rods are arranged obliquely to the direction of travel of the blanket and one of them is driven it is very important that the other one be driven in the same direction of rotation and at the same peripheral speed because the rods are caused in this way to have a counter-balancing effect with respect to lateral creeping of the blanket.

Figure 12:
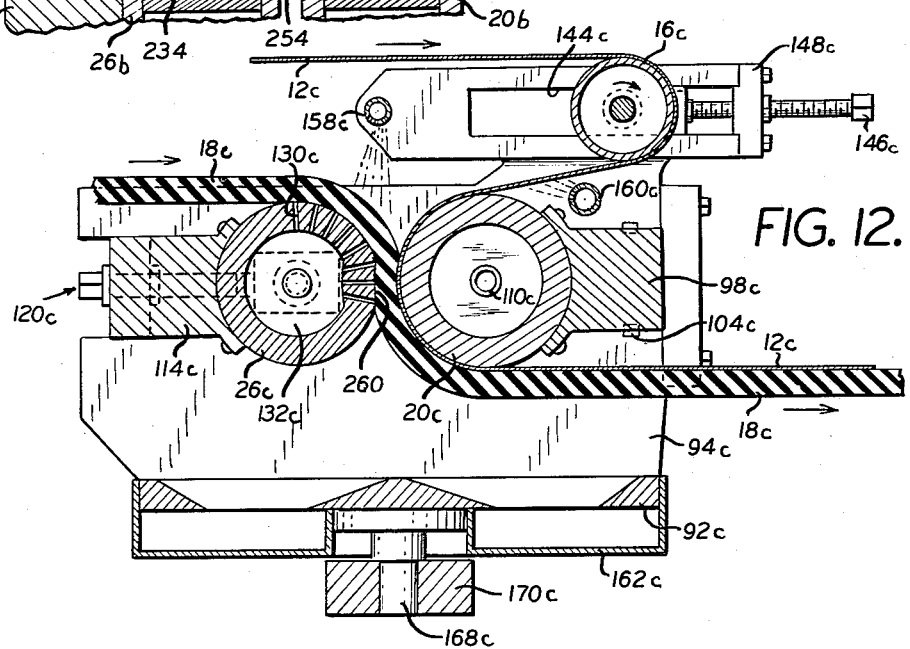
FIG. 12 is a view similar to FIG. 10 but showing the pressure rod as formed with a concave segment for providing an extended nip.

In FIG. 12 disclosure is made of a further modified unit 10c which is in all respects like the unit 10 of FIGS. 1 to 6 save that the rod 26c is formed with an external concave segment opposite the rod 20c. The concave surface 260 is desirably concentric with the opposed surface of the rod 20c. Corresponding reference characters have been applied to corresponding parts with the suffix "c" added in each instance, and no further detailed description will be given. The arrangement provides an extended region of maximum constriction and hence of maximum rubber speed. This constitutes also an illustration of the fact that the rods when non-rotary are not required to be of cylindrical form.

In FIGS. 18 and 19 disclosure is made of a composite paper shrinking mechanism for increasing the stretchability of paper both in the machine direction and in the cross machine direction. This mechanism includes a Cluett type unit 262 for shrinking the paper web 12d in the machine direction and a unit 10d for shrinking the web in the cross machine direction. The unit 262 is shown ahead of the unit 10d, but the order of arrangement could just as well be reversed.

The unit 262 may desirably be a duplicate of the unit shown in FIG. 1 of Cluett 2,624,245 and will not be described in detail herein. Briefly, it comprises a highly polished chromium faced heating drum 264 and an opposed endless blanket 266. The blanket 266 is guided on rollers 268, 270 and 272. The blanket is desirably of rubber and is pressed forcibly against the drum 264 by the pressure roll 268. The paper web engaging face of the blanket 266 is traveling at a relatively high speed (the same as that of the entering web) as the web enters the nip between the blanket and the drum 264, but the blanket is immediately slowed down as the paper contacting face of the blanket becomes concave. This causes the web to be condensed or shrunk longitudinally while the opposite faces of the web are confined between the blanket and the drum with sufficient pressure to prevent creeping. This increases the stretchability of the paper in the machine direction.

The paper passes from the unit 262 over a guide roll 274 to the unit 10d. The unit 10d is set to shrink the paper in the cross machine direction. Since the unit 10d is in all respects the same as the unit 10 of FIGS. 1 to 6, the description and explanation of the unit 10 are fully applicable to it. In the unit 10d, however, the rods 20d and 26d are set at an angle in the neighborhood of 45° in order to make the web stretchable in the cross machine direction. Corresponding reference characters have accordingly been applied with the suffix "d" added in each instnace, and no detailed description will be given.

In FIG. 20 disclosure is made of a further composite mechanism for cross shrinkage paper to give it two-way stretch. In this instance, however, the paper is shrunk at plus 45° to the machine direction, by a first unit 10e and is then shrunk at minus 45° to the machine direction, or at right angles to the direction of first shrinking, by a second unit 10f. For conservation of floor space the units are arranged vertically, in back to back tandem relation.

The paper is fed to the unit 10e around a guide roll 276 and passed thence into a unit 10e around the intake guide roll 16e of the unit. Except for details of frame structure and the upright disposition of the unit, the unit 10e is in all respects the same as the unit 10 of FIGS. 1 to 6, so that the description and explanation of the unit 10 is fully applicable. Corresponding reference characters have accordingly been applied to corresponding parts with the suffix "e" added in each instance and no detailed description will be given.

From the unit 10e the diagonally shrunk paper web is fed over guide roll 278 to the intake guide roll 16F of the unit 10f. Except for details of frame structure and the upright disposition of the unit, the unit 10f is in all respects the same as the unit 10 of FIGS. 1 to 6, so that the description and explanation of the unit 10 is fully applicable. Corresponding reference characters have accordingly been applied to corresponding parts with the suffix "f" added in each instance, and no detailed description will be given.

As regards the frame structure, it will be noted that a composite frame for the units 10e and 10f comprises legs 280, longitudinal frame members 282 and cross frame members 284. Rigid vertical frame members 286 take the place for both units of the frame members 46 of the unit 10.

The rods 26e and 20e of unit 10e extend upward and away from the observer as seen in FIG. 20, and the rods 26f and 20f of unit 10f also extend upward and away from the observer as seen in FIG. 20, the rods 20f and 26f being parallel to the rods 20e and 26e. The consequence of this arrangement is that the edge of the web nearer the observer comes first into engagement with the nip formed between the blanket 18e and the rod 20e, so that the web is shrunk from the far edge toward the near edge by the unit 10e. In the unit 10f the opposite situation prevails. The edge of the web remote from the observer comes first into engagement with the nip formed by the blanket 18f and the roll 20f so that the paper is shrunk from the near edge toward the far edge of the unit 10f.

The situation is roughly diagrammatically shown in FIG. 21. Here the web is shown as straightened out and the effect of the successive units 10e and 10f upon it illustrated. Up to the break in the paper the showing is the same as that of FIG. 7. From that point on the showing is precisely the reverse. The indrawn edge 40 of the web reaches the nip formed by the blanket 18f and the rod 20f first at the point of intersection of the nip line 28f with the cross line 30f. At that point the paper begins to be shrunk toward the edge 40 so that the edge 32 is drawn toward the edge 40 as indicated at 288 up to the point at which the edge 288 enters the nip 28f. Beyond 28f the edge portion designated 290 continues parallel to the edge 40. Diagonal lines 292 indicate the direction of the stretch which is put into the web by the unit 10e while diagonal lines 294 indicate the direction of the stretch which is put into the web by the unit 10f. The resulting web is stretchable in all directions as shown in FIG. 17.

While certain preferred embodiments of the invention have been illustrated and described in detail, it is to be understood that changes may be made therein and the invention embodied in other structures. It is not, therefore, the intention to limit the patent to the specific construction illustrated, but to cover the invention broadly in whatever form its principles may be utilized.

I claim:

1. An improved machine comprising, an endless resilient blanket having a smooth face, means for driving the blanket lengthwise in a closed path, a pair of parallel spaced rods disposed to extend across the blanket at opposite sides thereof and in such relation to the blanket and to one another that the blanket is caused to have a wrap around the first rod in one direction of curvature and then around the other rod in the opposite direction of curvature, means for feeding a moistened web between said blanket and said second rod, said rods cooperating with one another to squeeze the blanket to a constricted thickness whereby the resilient face of the blanket adjacent the second rod is caused to be temporarily accelerated, said second rod being smooth faced, and means for selectively adjusting the angular relation of the rods to the direction of travel of said blanket throughout an extensive range, one of whose limits is substantially at right angles to the normal direction of blanket travel.

2. An angled bar compactor for increasing the toughness and extensibility of a paper web in a preselected direction comprising, in combination, an endless resilient blanket having a smooth face, means for tensioning and driving the blanket lengthwise in a closed path, a pair of parallel spaced rods disposed to extend across the blanket at opposite sides thereof and in such relation to the blanket and to one another that the blanket is caused to have a wrap around the first rod in one direction of curvature and then around the second rod in the opposite direction of curvature, means for feeding a moistened web between said blanket and said second rod, said second rod cooperating with said tensioned blanket to maintain a substantial pressure therebetween, means for adjusting the space between said rods selectively to a width which is less than the thickness of said blanket, and means for adjusting the angular relation of the rods to the direction of travel of the blanket throughout an extensive range including an angle of ninety degrees with the direction of blanket travel.

3. A machine for increasing the toughness and extensibility of a paper web comprising, in combination, an endless blanket having a smooth faced resilient body, means for driving the blanket lengthwise in a closed path, a pair of parallel spaced rods extending obliquely across the direction of travel of the blanket at opposite sides thereof in such relation to the blanket and to one another that the blanket is caused to have a wrap around the first rod in one direction of curvature and then around the other rod in the opposite direction of curvature, said rods being non-rotary and being spaced by a distance less than the thickness of said blanket to form a nip, and means for feeding a moistened web into said nip between said blanket and said other rod.

4. In combination, an endless resilient blanket having a smooth face, means for tensioning and for driving the blanket lengthwise in a closed path, first and second spaced rod means extending obliquely across the direction of travel of the blanket at opposite sides thereof with the blanket wrapped around the first rod means in one direction of curvature and around the second rod means in the opposite direction of curvature, means for relatively adjusting the distance between said spaced rod means selectively to spacings less than the thickness of said blanket to form a nip in which the web contacting face of the blanket is temporarily accelerated, and means for feeding a moistened paper web into said nip between said blanket and said second rod.

5. A compactor of paper comprising, an endless smooth faced resilient blanket, means for driving the blanket lengthwise in a closed path, a pair of parallel, non-rotary rods extending obliquely across the direction of travel of the blanket at opposite sides thereof and in such relation to the blanket and to one another that the blanket is caused to have a wrap around the first rod in one direction of curvature and then around the second rod in the opposite direction of curvature, means for establishing a space between said parallel rods which is of a dimension less than the thickness of said blanket and through which said blanket moves, means for feeding moistened paper between said blanket and said second rod, and lubricating means for decreasing the friction between said first rod and said blanket and between said second rod and the paper.

6. A machine for modifying fibrous web material comprising, an endless resilient blanket having a smooth face, means driving said blanket lengthwise in a closed path, spaced, first and second parallel rods extending obliquely across the blanket and disposed respectively to engage opposite faces of the blanket to form a blanket constricting space between them, said blanket having a wrap around said first rod in one direction of curvature and then around said second rod in the opposite direction of curvature, means driving the rods rotatively in the same direction, with the surface of one of said rods traveling in the same direction as the blanket surface engaged by it, and the surface of the other of said rods traveling counter to the direction of the blanket surface engaged by it, and means feeding a moistened paper web into said blanket constricting space between said blanket and said second rod.

7. An angled bar compactor for shrinking a web material in a pre-selected direction comprising, in combination, an endless blanket having a resilient body, means for driving the blanket lengthwise in a closed path, two rods disposed to present parallel surfaces extending obliquely across the direction of travel of the blanket on opposite sides thereof and said rods disposed in such relation to the blanket and to one another that the blanket is caused to have a wrap around the first rod in one direction of curvature and then around the second rod in the opposite direction of curvature, means for feeding a web material between said blanket and said second rod, and means for establishing a space between said rods through which the blanket moves and which is of less dimension than the thickness of said blanket.

8. A compactor for shrinking web material comprising, an endless resilient blanket, means for driving the blanket lengthwise in a closed path, a pair of parallel rods extending obliquely across the direction of travel of the blanket on opposite sides thereof and in such relation to the blanket and to one another that the blanket is caused to have a wrap around the first rod in one direction of curvature and then around the second rod in the opposite direction of curvature, means for establishing a space between said rods through which the blanket moves and which is of a dimension less than the thickness of said blanket, means for feeding web material between said blanket and said second rod, and means for decreasing the friction between said first rod and said blanket and between said second rod and the web material.

9. An uncreped web formed from bonded flexible fibers, said web being characterized by having substantially parallel faces and substantial extensibility in at least two directions, said extensibility in both directions being in excess of the primitive resiliency and elasticity of the starting web and in excess of the extensibility provided by compaction of said starting web in one direction, one of said directions of extensibility crossing the faces of said web in an oblique direction, the other direction of extensibility being at an angle to the oblique direction of extensibility, the fibers within the web which lie lengthwise generally in said one direction of extensibility being rearranged and distorted within the space between said web faces by compression in said one direction, the fibers within the web which lie lengthwise generally in said other direction of extensibility being rearranged and distorted within the space between said web faces, by compression in said other direction.

10. A relatively dense uncreped paper web initially formed of water laid, adherent cellulose fibers, said web having maximum extensibility in a direction parallel to its faces and oblique to the direction in which the web moved during formation thereof, said direction of extensibility lying within the portion of a segment that forms an angle of less than 60 degrees relative the cross machine direction, said extensibility being continuous throughout said web in said direction of extensibility and well in excess of its primitive elastic limit, whose fibers after formation have been crowded and pushed together uniformly over the web in said oblique direction, and in the space between the faces of the web to provide such extensibility, the crowded and pushed fibers having between them, in that relation, a bond due to initial drying giving maximum and continuous resistance to permanent elongation in said oblique direction, short of rupture of the web.

11. In a continuous process of producing an extensible paper web having maximum extensibility in a direction at a predetermined angle to the cross-machine direction comprising the steps of moving a deformable surfaced blanket means in a machine direction, the surface of said blanket means being capable of continuously stretching and contracting, stretching said deformable surface a predetermined amount, feeding a paper web, while in a suitably plastic condition onto said stretched surface, subjecting said stretched surface to a pressure applied throughout a zone extending in a selected obliquely angular direction to the machine direction of travel of said blanket means to compel contraction of said stretched surface in a direction lying within a sector which includes an arc of less than 60 degrees relative the cross-machine direction, diminishing the applied pressure through at least a portion of said zone from a peak value to progressively lower values in the direction of blanket means travel to permit said stretched surface to contract in said direction of less than 60 degrees relative the cross-machine direction and shrink the paper web in said direction of contraction while a sufficient pressure is still maintained on the paper web to prevent the creping of said paper web, whereby the resulting paper web has a controlled extensibility both as to amount and direction at an angle to the cross-machine direction.

12. In a continuous process of producing an extensible paper web having maximum extensibility in a direction at a predetermined angle to the cross-machine direction comprising the steps of moving a deformable surfaced blanket means in a machine direction, the surface of said blanket means being capable of continuously stretching and contracting, stretching said deformable surface a predetermined amount, feeding a paper web, while in a suitably plastic condition onto said stretched surface, subjecting said stretched surface to a pressure applied throughout a zone extending in a selected obliquely angular direction to the machine direction of travel of said blanket means to compel contraction of said stretched surface in a direction lying within a sector which includes an arc of less than 60 degrees relative the cross-machine direction, and said direction of contraction also lying within a sector which includes an arc that is greater than 90° which is formed between said direction along which pressure is applied and said machine direction, diminishing the applied pressure through at least a portion of said zone from a peak value to progressively lower values in the direction of blanket means travel to permit said stretched surface to contract in said direction of less than 60 degrees relative the cross-machine direction and shrink the paper web in said direction of contraction while a sufficient pressure is still maintained on the paper web to prevent the creping of said paper web, whereby the resulting paper web has a controlled extensibility both as to amount and direction at an angle to the cross-machine direction.

References Cited in the file of this patent

UNITED STATES PATENTS

| | | |
|---|---|---|
| 814,351 | Brigham et al. | Mar. 6, 1906 |
| 1,167,403 | Hoberg | Jan. 11, 1916 |
| 1,643,147 | Angier | Sept. 20, 1927 |
| 1,905,916 | Leguillon | Apr. 25, 1933 |
| 1,953,142 | Willis | Apr. 3, 1934 |
| 2,008,181 | Kemp | July 16, 1935 |
| 2,021,975 | Wrigley et al. | Nov. 26, 1935 |
| 2,071,347 | Kemp | Feb. 23, 1937 |
| 2,257,429 | Ruegenberg | Sept. 30, 1941 |
| 2,267,470 | Kabela et al. | Dec. 23, 1941 |
| 2,335,313 | Rowe et al. | Nov. 30, 1943 |
| 2,494,334 | Dorst | Jan. 10, 1950 |
| 2,535,734 | Grettve | Dec. 26, 1950 |
| 2,624,245 | Cluett | Jan. 6, 1953 |
| 2,842,092 | Pomper | July 8, 1958 |